(12) United States Patent
Tan et al.

(10) Patent No.: US 11,823,437 B2
(45) Date of Patent: Nov. 21, 2023

(54) TARGET DETECTION AND MODEL TRAINING METHOD AND APPARATUS, DEVICE AND STORAGE MEDIUM

(71) Applicant: BEIJING BAIDU NETCOM SCIENCE TECHNOLOGY CO., LTD., Beijing (CN)

(72) Inventors: Xiao Tan, Beijing (CN); Xiaoqing Ye, Beijing (CN); Hao Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/658,508

(22) Filed: Apr. 8, 2022

(65) Prior Publication Data
US 2023/0095114 A1    Mar. 30, 2023

(30) Foreign Application Priority Data
Sep. 29, 2021   (CN) .......................... 202111153307.1

(51) Int. Cl.
*G06V 10/00* (2022.01)
*G06V 10/77* (2022.01)
(Continued)

(52) U.S. Cl.
CPC ........ *G06V 10/7715* (2022.01); *G06T 3/0031* (2013.01); *G06V 10/80* (2022.01); *G06V 10/82* (2022.01); *G06V 20/56* (2022.01)

(58) Field of Classification Search
CPC ........ G06V 10/40; G06V 10/42; G06V 10/80; G06V 10/82; G06V 10/421; G06V 10/422;
(Continued)

(56) References Cited

U.S. PATENT DOCUMENTS 4,163,214 A * 7/1979 Komori ................ G06V 30/184
382/196
5,239,592 A * 8/1993 Kameyama .......... G06V 30/146
382/177
(Continued)

FOREIGN PATENT DOCUMENTS

CN       112307978 A      2/2021
CN       112651364 A      4/2021
(Continued)

OTHER PUBLICATIONS

First Office Action for CN202111153307.1, dated May 24, 2022, 17 pgs.
(Continued)

*Primary Examiner* — Amir Alavi
(74) *Attorney, Agent, or Firm* — Kwan & Olynick LLP

(57) ABSTRACT

The present disclosure provides a target detection and model training method and apparatus, a device and a storage medium, and relates to the field of artificial intelligence, and in particular, to computer vision and deep learning technologies, which may be applied to smart city and intelligent transportation scenarios. The target detection method includes: performing feature extraction processing on an image to obtain image features of a plurality of stages of the image; performing position coding processing on the image to obtain a position code of the image; obtaining detection results of the plurality of stages of a target in the image based on the image features of the plurality of stages and the position code; and obtaining a target detection result based on the detection results of the plurality of stages.

18 Claims, 10 Drawing Sheets

(51) Int. Cl.
*G06V 10/82* (2022.01)
*G06V 10/80* (2022.01)
*G06T 3/00* (2006.01)
*G06V 20/56* (2022.01)

(58) Field of Classification Search
CPC ...... G06V 10/44; G06V 10/70; G06V 10/774; G06V 10/766; G06V 10/7715; G06V 20/56; G06V 30/191; G06V 30/19147; G06N 20/00; G06T 9/002; G06T 9/00; G06T 9/008; G06T 3/0031; G06T 2207/20081
See application file for complete search history.

(56) References Cited

U.S. PATENT DOCUMENTS

| | | | | |
|---|---|---|---|---|
| 5,588,074 | A * | 12/1996 | Sugiyama | G06V 30/242 382/209 |
| 10,362,306 | B2 * | 7/2019 | Shibayama | G06F 18/2148 |
| 10,542,270 | B2 * | 1/2020 | Zhou | H04N 19/187 |
| 10,762,200 | B1 * | 9/2020 | Salem | G06F 21/563 |
| 11,030,394 | B1 * | 6/2021 | Kozareva | G06F 40/30 |
| 11,615,523 | B2 * | 3/2023 | Wang | G06V 10/82 382/103 |
| 2013/0085751 | A1 * | 4/2013 | Takahashi | G10L 19/018 704/226 |
| 2013/0322742 | A1 * | 12/2013 | Walton | G06V 10/80 382/203 |
| 2021/0201044 | A1 | 7/2021 | Herdade et al. | |
| 2021/0256401 | A1 * | 8/2021 | Elkind | G06F 21/56 |
| 2023/0095114 | A1 * | 3/2023 | Tan | G06T 3/0031 382/100 |

FOREIGN PATENT DOCUMENTS

| | | |
|---|---|---|
| CN | 112686207 A | 4/2021 |
| CN | 112906502 A | 6/2021 |
| CN | 113139543 A | 7/2021 |
| CN | 113139608 A | 7/2021 |
| CN | 113222916 A | 8/2021 |
| CN | 113283409 A | 8/2021 |
| CN | 113361428 A | 9/2021 |
| CN | 113361458 A | 9/2021 |
| CN | 113420681 A | 9/2021 |

OTHER PUBLICATIONS

Multi-target tracking algorithm based on pedestrian global features, Aug. 31, 2021, 2 pgs.
Notice of Allowance for CN202111153307.1, dated Aug. 20, 2022, 3 pgs.
Optimization of Vulnerability Detection Model Based on Improved SMOTE Algorithm and Position Embedding, Jun. 30, 2021, 2 pgs.
Kuran Pan, et al., "3D Object Detection with Pointformer", arXiv:2012.11409v3 [cs.CV], Jun. 22, 2021, 14 pgs.
Zhigang Dai, et al., "UP-DETR: Unsupervised Pre-training for Object Detection with Transformers", arXiv:2011.09094v2 [cs.CV] Apr. 7, 2021, 11 pgs.

* cited by examiner

TARGET DETECTION AND MODEL TRAINING METHOD AND APPARATUS, DEVICE AND STORAGE MEDIUM

The present application claims the priority of Chinese Patent Application No. 202111153307.1, filed on Sep. 29, 2021, with the title of "TARGET DETECTION AND MODEL TRAINING METHOD AND APPARATUS, DEVICE AND STORAGE MEDIUM". The disclosure of the above application is incorporated herein by reference in its entirety.

FIELD OF THE DISCLOSURE

The present disclosure relates to the field of artificial intelligence, and specifically to computer vision and deep learning technologies, may be applied to smart city and intelligent transportation scenarios, and relates, in particular, to a target detection and model training method and apparatus, a device and a storage medium.

BACKGROUND OF THE DISCLOSURE 3D target detection is widely used in scenarios such as automatic driving. 3D target detection refers to detection of 3D borders of a target in an image and a category thereof, so as to provide information for a controller to plan a reasonable route.

In the related art, 3D target detection may be performed based on geometric constraints or semantic knowledge.

SUMMARY OF THE DISCLOSURE

The present disclosure provides a target detection and model training method and apparatus, a device and a storage medium.

According to one aspect of the present disclosure, a target detection method is provided, including: performing feature extraction processing on an image to obtain image features of a plurality of stages of the image; performing position coding processing on the image to obtain a position code of the image; obtaining detection results of the plurality of stages of a target in the image based on the image features of the plurality of stages and the position code; and obtaining a target detection result based on the detection results of the plurality of stages.

According to another aspect of the present disclosure, a target detection model training method is provided, including: performing feature extraction processing on an image sample to obtain image features of a plurality of stages of the image sample; performing position coding processing on the image sample to obtain a position code of the image sample; obtaining detection results of the plurality of stages of a target in the image sample based on the image features of the plurality of stages and the position code; constructing a total loss function based on the detection results of the plurality of stages; and training a target detection model based on the total loss function.

According to another aspect of the present disclosure, an electronic device is provided, including: at least one processor; and a memory communicatively connected with the at least one processor; wherein the memory stores instructions executable by the at least one processor, and the instructions are executed by the at least one processor to enable the at least one processor to perform a target detection method, wherein the target detection method includes: performing feature extraction processing on an image to obtain image features of a plurality of stages of the image; performing position coding processing on the image to obtain a position code of the image; obtaining detection results of the plurality of stages of a target in the image based on the image features of the plurality of stages and the position code; and obtaining a target detection result based on the detection results of the plurality of stages.

According to another aspect of the present disclosure, an electronic device is provided, including: at least one processor; and a memory communicatively connected with the at least one processor; wherein the memory stores instructions executable by the at least one processor, and the instructions are executed by the at least one processor to enable the at least one processor to perform a target detection model training method, wherein the target detection model training method includes: performing feature extraction processing on an image sample to obtain image features of a plurality of stages of the image sample; performing position coding processing on the image sample to obtain a position code of the image sample; obtaining detection results of the plurality of stages of a target in the image sample based on the image features of the plurality of stages and the position code; constructing a total loss function based on the detection results of the plurality of stages; and training a target detection model based on the total loss function.

According to another aspect of the present disclosure, there is provided a non-transitory computer readable storage medium with computer instructions stored thereon, wherein the computer instructions are used for causing a computer to perform a target detection method, wherein the target detection method includes: performing feature extraction processing on an image to obtain image features of a plurality of stages of the image; performing position coding processing on the image to obtain a position code of the image; obtaining detection results of the plurality of stages of a target in the image based on the image features of the plurality of stages and the position code; and obtaining a target detection result based on the detection results of the plurality of stages.

According to another aspect of the present disclosure, there is provided a non-transitory computer readable storage medium with computer instructions stored thereon, wherein the computer instructions are used for causing a computer to perform a target detection model training method, wherein the target detection model training method includes: performing feature extraction processing on an image sample to obtain image features of a plurality of stages of the image sample; performing position coding processing on the image sample to obtain a position code of the image sample; obtaining detection results of the plurality of stages of a target in the image sample based on the image features of the plurality of stages and the position code; constructing a total loss function based on the detection results of the plurality of stages; and training a target detection model based on the total loss function.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

In the related art, 3D target detection may be performed based on geometric constraints or semantic knowledge. However, the detection accuracy thereof is low.

In order to improve the accuracy of target detection, the present disclosure provides the following embodiments.

Figure 1:
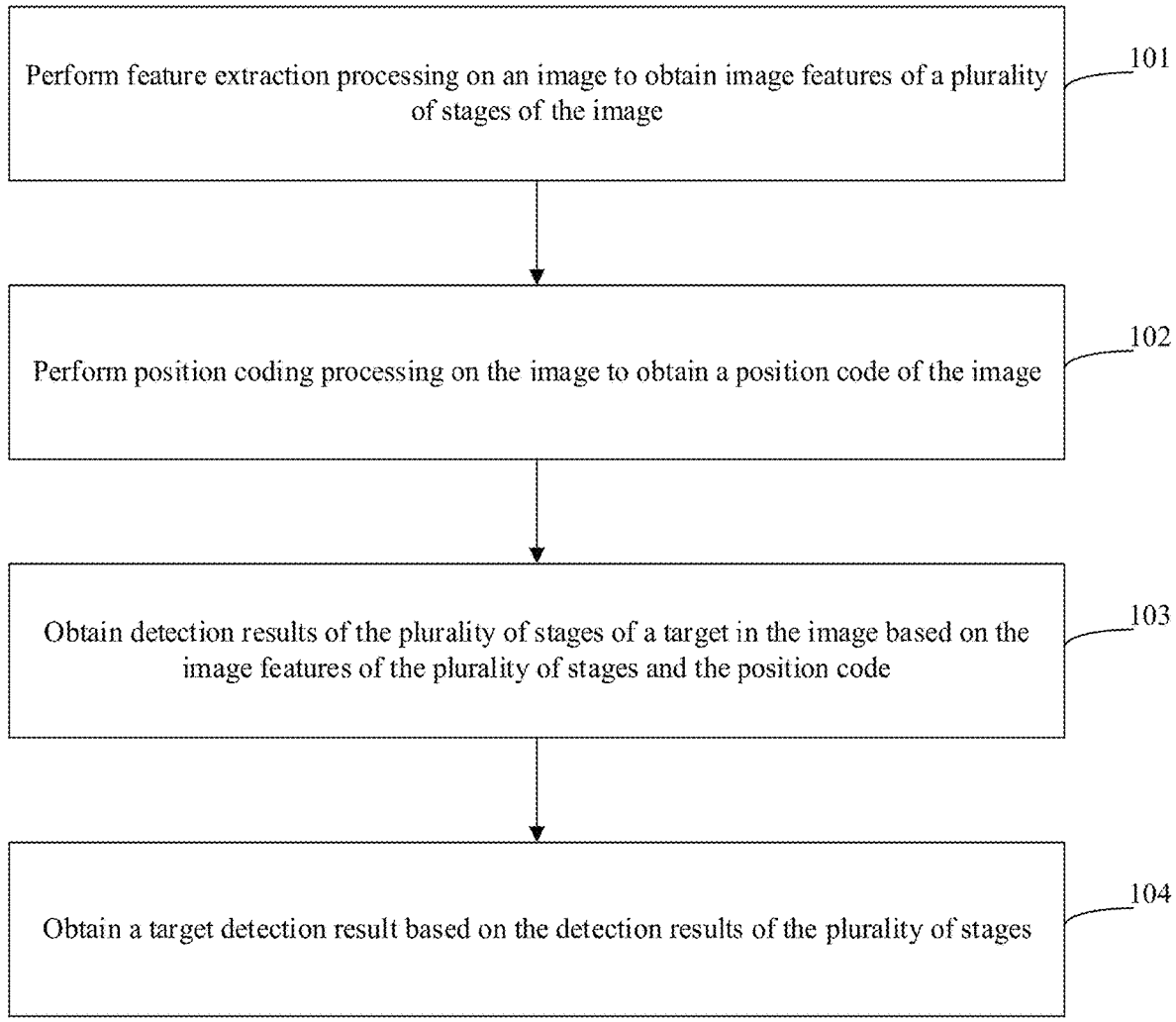
FIG. 1 is a schematic diagram according to a first embodiment of the present disclosure.

FIG. 1 is a schematic diagram according to a first embodiment of the present disclosure. This embodiment provides a target detection method. The method includes the following steps.

In 101, feature extraction processing is performed on an image to obtain image features of a plurality of stages of the image.

In 102, position coding processing is performed on the image to obtain a position code of the image.

In 103, detection results of the plurality of stages of a target in the image are obtained based on the image features of the plurality of stages and the position code.

In 104, a target detection result is obtained based on the detection results of the plurality of stages.

This embodiment may be performed by a target detection apparatus. The target detection apparatus may be software, hardware or a combination of hardware and software. The apparatus may be located in an electronic device. The electronic device may be located at a server or a user terminal. The server may be a local server or a cloud. The user terminal may include mobile devices (such as mobile phones and tablets), vehicle-mounted terminals (such as automobile machines), wearable devices (such as smart watches and smart bracelets), and smart home devices (such as smart TVs and smart speakers).

Target detection may be applied to a variety of scenarios, such as automatic driving, assisted driving and robotics.

Taking automatic driving as an example, autonomous vehicles (self-driving automobiles), also known as driverless vehicles, computer-driven vehicles or wheeled mobile robots, are intelligent vehicles that realize driverless driving through a computer system.

Figure 2:
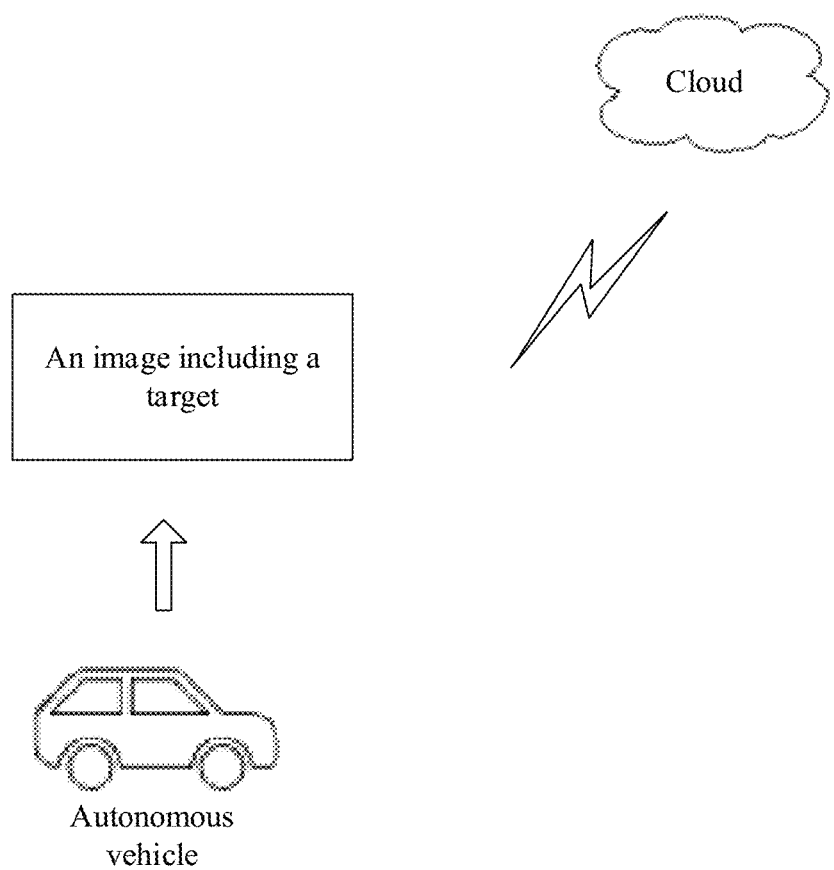
FIG. 2 is a schematic diagram according to a second embodiment of the present disclosure.

As shown in FIG. 2, an autonomous vehicle may be provided with a camera. The camera may capture images around the vehicle. Specifically, the images may be captured by a monocular camera. The autonomous vehicle captures images and may transmit the images to a cloud over a network. The cloud may perform target detection based on the images. Further, the cloud may perform subsequent operations based on target detection results, such as obstacle avoidance and route planning based on target detection results.

The images may include targets. The targets are objects of interest. Further, the targets may be 3D targets. Taking an autonomous vehicle as an example, the autonomous vehicle may detect other vehicles and pedestrians in front of the vehicle. The other vehicles and pedestrians are 3D targets.

For example, the cloud performs target detection. After the cloud acquires an image, feature extraction processing may be performed on the image to obtain image features of a plurality of stages of the image.

The image features of the plurality of stages have different scale information. The different scale information may be obtained by a convolution operation on the image through sliding windows of different sizes.

The image features of the image may be extracted by using a deep neural network.

The deep neural network may be a Deep Convolutional Neural Network (DCNN), with a backbone such as Resnet50.

The DCNN may include a plurality of stages, and in each stage, a feature map of the corresponding stage may be outputted as the image feature of the stage.

Figure 3:
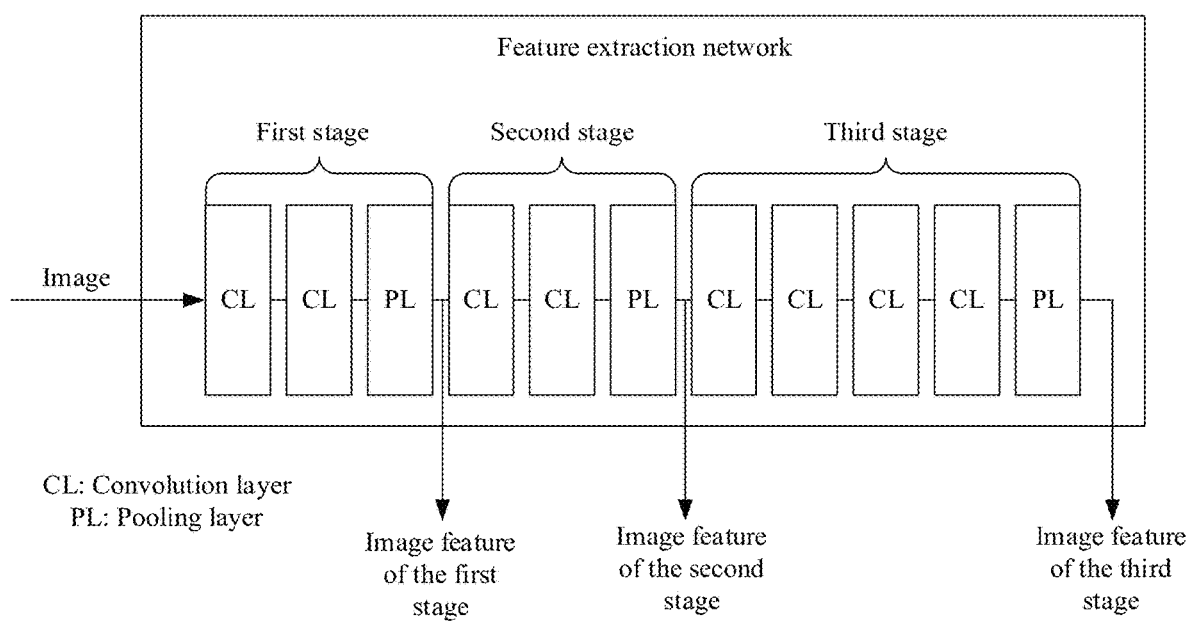
FIG. 3 is a schematic diagram according to a third embodiment of the present disclosure.

For example, referring to FIG. 3, it is assumed that a feature extraction network includes three stages, which are represented by a first stage, a second stage and a third stage respectively. Each stage may include a convolution layer and a pooling layer, and a number of convolution layers included in each stage may be the same or different. After an image is inputted to the feature extraction network, network layers (the convolution layer and the pooling layer) of each stage may sequentially process the image to obtain image features of each stage respectively. Based on the example in FIG. 3, image features of three stages may be obtained.

After the cloud acquires an image, position coding processing may be performed on the image to obtain a position code of the image.

Position coding may be performed corresponding to each pixel in the image, and position coordinates of the pixels are coded as values between [0,1].

For example, calculation formulas of position codes may be:

$$PE_i(0) = \sin\left(\frac{u}{W} * 2\pi\right)$$

$$PE_i(1) = \sin\left(\frac{v}{H} * 2\pi\right)$$

where [W,H] denote a width and a height of the image respectively, (u,v) denotes coordinates of an $i^{th}$ pixel, u=[0, 1, . . . , W−1], v=[0, 1, . . . , H−1], and $PE_i(0)$ and $PE_i(1)$ denote position codes of the $i^{th}$ pixel of the image.

Figure 4:
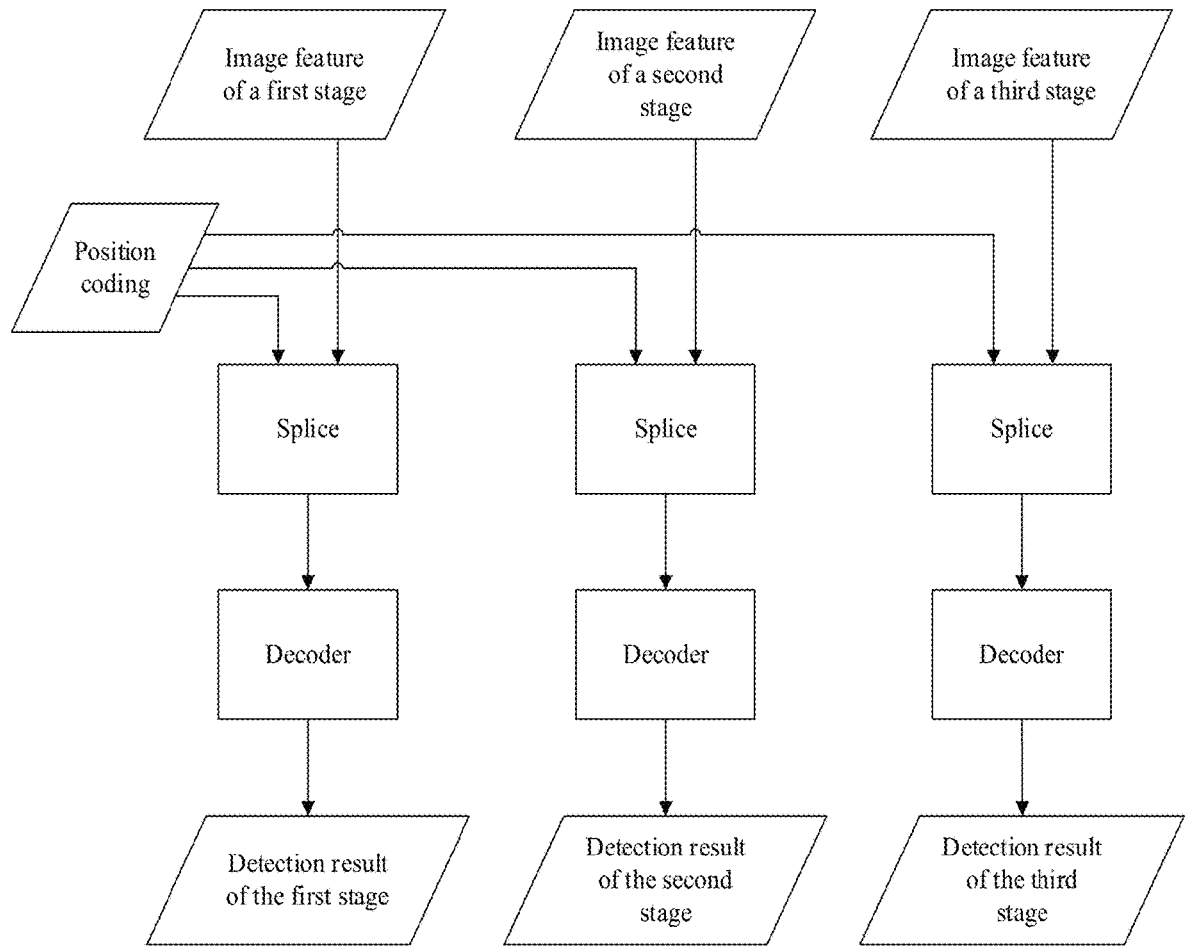
FIG. 4 is a schematic diagram according to a fourth embodiment of the present disclosure.

After the image features and the position code of the image are acquired, as shown in FIG. 4, corresponding to each stage, the image feature and the position code of the stage may be spliced as input to a decoder. A tensor after splicing is processed by the decoder to obtain a detection result. Splicing means joining vectors or tensors together. That is, assuming that a dimension of the image feature is [W, H, 1] and a dimension of the position code is [W, H, 2], a dimension of the tensor after splicing is [W, H, 3].

The decoder may be implemented by using various prior arts, such as Deep3D Box and M3D-RPN. Taking 3D target detection as an example, assuming that there are N stages, detection results of the N stages may be expressed as: $box_{3d}^1$, $box_{3d}^2$, . . . , $box_{3d}^N$. Each detection result may be a 7-dimensional tensor, expressed as: $box_{3d}^i$=[LWH, XYZ, Angle], where LWH denotes length, width and height, xyz denotes coordinates of a center point, and Angle denotes an orientation angle, where i=1, 2, . . . , N.

After the detection results of the stages are obtained, a target detection result may be obtained based on the detection results of the stages. The detection results of the stages may be referred to as preliminary detection results. The target detection result is a final detection result.

In the embodiment of the present disclosure, scale information may be referenced in target results by obtaining a target detection result based on detection results of a plurality of stages, and distance information may be referenced by considering a position code when the detection results of the plurality of stages are obtained. Therefore, the target detection results refer to the scale information and the distance information, which can improve the accuracy of target detection.

In some embodiments, the detection results of the plurality of stages include detection results of at least one category, and the step of obtaining a target detection result based on the detection results of the plurality of stages includes:
  determining to-be-fused results in the detection results of the plurality of stages;
  fusing the to-be-fused results to obtain target detection results of categories corresponding to the to-be-fused results; and/or
  taking not-to-be-fused results in the detection results of the plurality of stages as target detection results of categories corresponding to the not-to-be-fused results.

That is, detection results of different stages may be fused to obtain the target detection result; and/or a detection result of a certain stage is directly taken as the target detection result.

The detection result may include results of a plurality of categories. For example, target categories may include vehicles and humans. Corresponding to each category, detection results of different stages may be fused.

Figure 5:
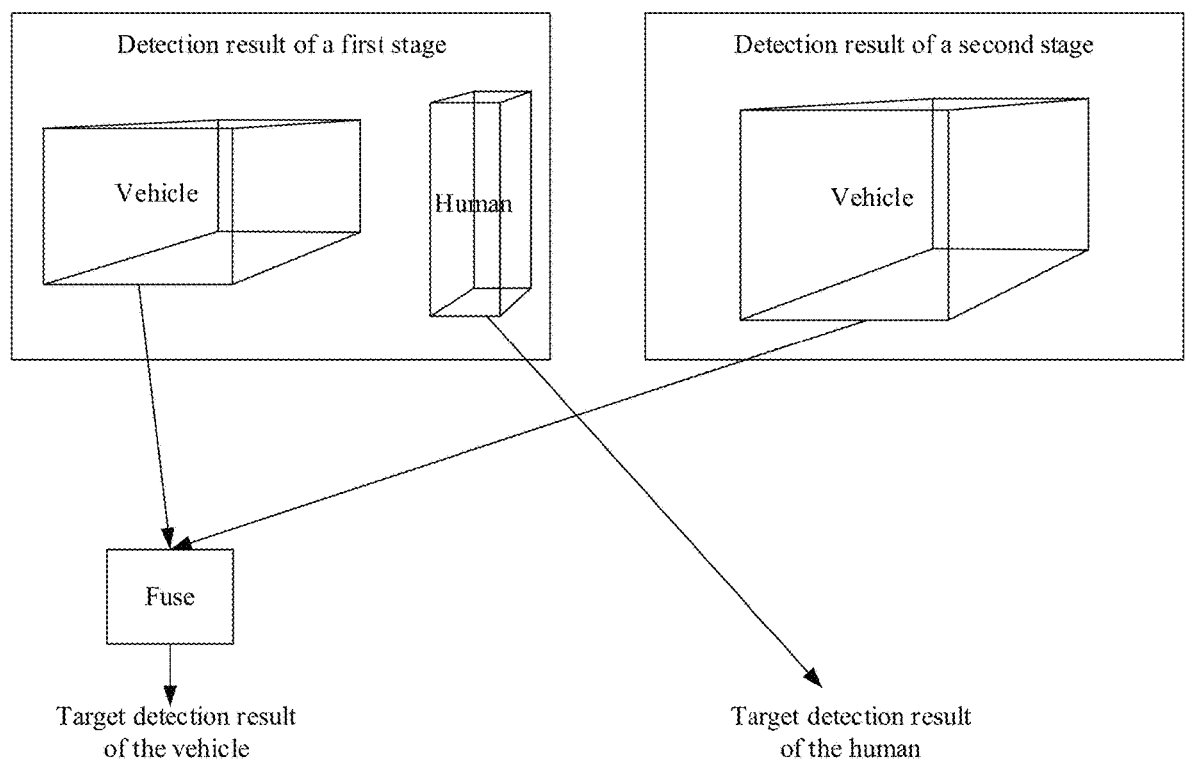
FIG. 5 is a schematic diagram according to a fifth embodiment of the present disclosure.

Taking detection results of two stages as an example, referring to FIG. 5, it is assumed that the two categories are vehicles and humans. Assuming that a vehicle is detected in the two stages, detection results of the vehicle in the two stages may be fused to obtain a target detection result of the vehicle, that is, a final detection result of the vehicle. Assuming that a human is detected in only one stage, a detection result of the stage in which the human is detected may be directly taken as a target detection result of the human, that is, a final detection result of the human.

The accuracy of detection may be improved by fusing detection results of a plurality of stages. In addition, the comprehensiveness of target detection may be improved by fusing and/or directly taking the detection result of a certain stage as the target detection result.

In some embodiments, the method further includes: determining uncertainties of the detection results of the plurality of stages based on the image features of the plurality of stages and the position code. Correspondingly, the step of fusing the to-be-fused results includes: fusing the to-be-fused results based on the uncertainties.

In some embodiments, the step of determining uncertainties of the detection results of the plurality of stages based on the image features of the plurality of stages and the position code includes: splicing the image features of the plurality of stages and the position code to obtain a splicing tensor; and processing the splicing tensor by using an attention network by taking the splicing tensor as input to the attention network, so as to obtain the uncertainties of the detection results of the plurality of stages.

Figure 6:
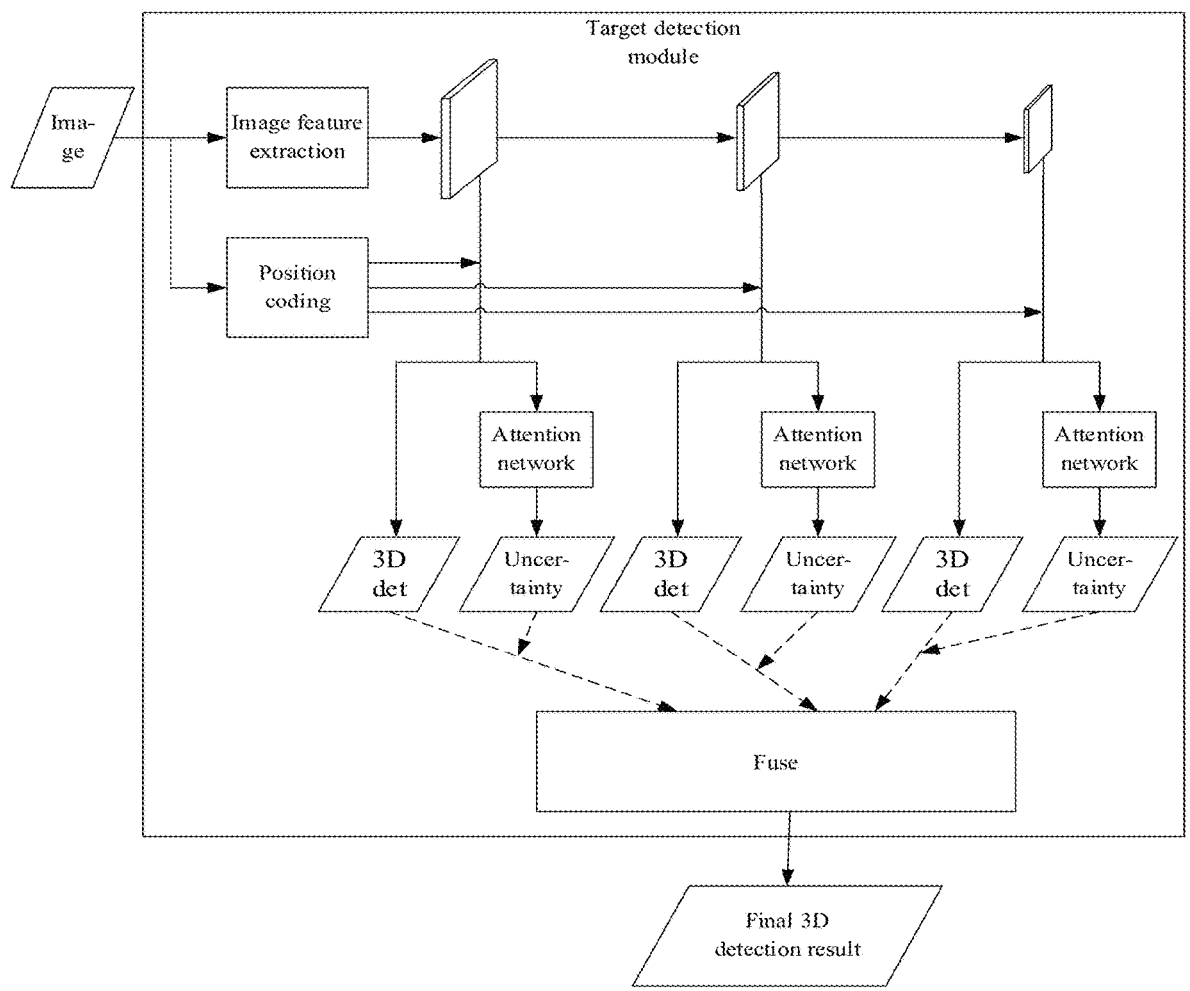
FIG. 6 is a schematic diagram according to a sixth embodiment of the present disclosure.

As shown in FIG. 6, a 3D target in an image may be detected by a target detection model. Taking three stages as an example, after image features of the stages are obtained, the image features of the stages are spliced with a position code respectively. A splicing manner may be obtained with reference to the related description in the above embodiment. A splicing tensor may be obtained after splicing. One path of the splicing tensor may be inputted into a decoder (not shown in FIG. 6), and the detection results of the stages are outputted, which are represented by 3D det in FIG. 6. The other path of the splicing tensor is inputted to an attention network, and uncertainties are outputted. The uncertainties may also be degrees of confidence or the like, which are values between [0,1].

The attention network may be an ordinary convolutional network or a dilated cony network.

Uncertainties of N stages may be respectively represented as: $Un^1$, $Un^2$, . . . , $Un^N$.

The accuracy of the target detection may be further improved by fusion based on the uncertainties.

The accuracy of the uncertainties may be improved by obtaining the uncertainties through the attention network.

In some embodiments, the detection results of the plurality of stages are 3D results, and the step of determining to-be-fused results in the detection results of the plurality of stages includes: mapping the 3D results to 2D results; determining Intersection-over-Unions (IoUs) between the 2D results corresponding to the detection results of the plurality of stages; and taking the detection results of the plurality of stages as the to-be-fused results if the IoUs are greater than a preset threshold.

Taking 3D target detection as an example, the detection results are 3D results. For example, referring to FIG. 5, the detection results corresponding to vehicles and humans are 3D results.

After 3D results of the stages are obtained, the 3D results may be mapped to 2D results. Mapping may be performed based on internal parameters of a camera (or a camera on the vehicle). A specific mapping formula may be obtained with reference to an existing 3D to 2D conversion formula.

After the 2D results are obtained, the IoUs may be obtained by pairwise operation of the 2D results of different stages.

Figure 7:
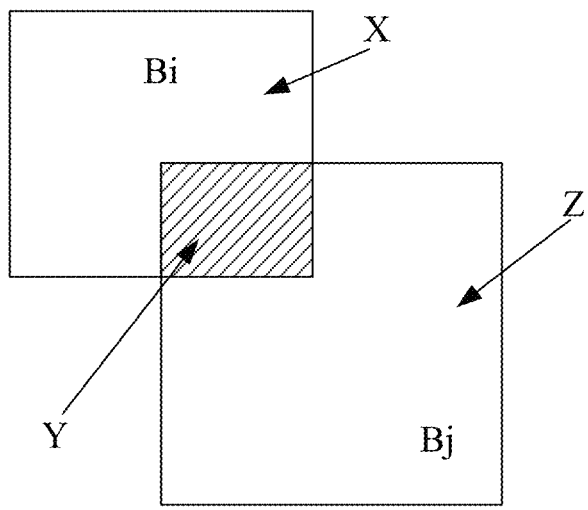
FIG. 7 is a schematic diagram according to a seventh embodiment of the present disclosure.

As shown in FIG. 7, assuming that 2D results of two stages are Bi and Bj respectively, an overlapping part of Bi and Bj is represented by Y, the part of Bi except Y is represented by X, and the part except Y in Bj is represented by Z, a calculation formula for an IoU between Bi and Bj may be expressed as Y/(X+Y+Z).

Taking two stages as an example, assuming that a 2D result corresponding to the first stage includes A1 and B1 and a 2D result corresponding to the second stage includes A2 and B2, an IoU between A1 and A2, an IoU between A1 and B2, and an IoU between B1 and B2 may be calculated respectively. Assuming that the IoU between A1 and A2 is greater than a preset threshold (such as 0.5), 3D detection results corresponding to A1 and A2 are to-be-fused results.

The to-be-fused results, after being obtained, may be fused based on the uncertainties. Specifically, a calculation formula for fusion is:

$$\text{box}_{3d}^{fuse} = \left(\sum_{i=1}^{N} \frac{\text{box}_{3d}^{i}}{Un^i}\right) / \left(\sum_{i=1}^{N} \frac{1}{Un^i}\right)$$

where $\text{box}_{3d}^{fuse}$ denotes a fusion result. The fusion result is taken as a final target detection result. Refer to the related description in the above embodiment for other parameters.

By determining the to-be-fused results based on the IoUs, detection results of different stages of a same category may be fused, so as to improve the accuracy of target detection.

Further, corresponding to detection results of each category, detection results of respective stages may also be obtained by using a non-maximum suppression algorithm. For example, corresponding to the detection result of the vehicle in the first stage, a plurality of 3D borders of the vehicle may be obtained during the detection. In this case, one 3D border of the vehicle may be obtained as the detection result of the vehicle in the first stage by using the non-maximum suppression algorithm.

In addition, if the IoUs are less than the preset threshold, the detection result with a low uncertainty may be selected as the final target detection result. For example, assuming that the IoU between B1 and B2 is less than the preset threshold and the uncertainty of B1 is less than that of B2, the 3D detection result of the first stage corresponding to B1 may be taken as a final target detection result of the corresponding category.

In the embodiment of the present disclosure, for 3D target detection of monocular images, a problem caused by a monocular effect of "big when close, small when far" may be solved by using multi-scale information and distance information. The accuracy of monocular 3D detection is improved by position coding and fusion of detection results of different stages based on uncertainties.

Figure 8:
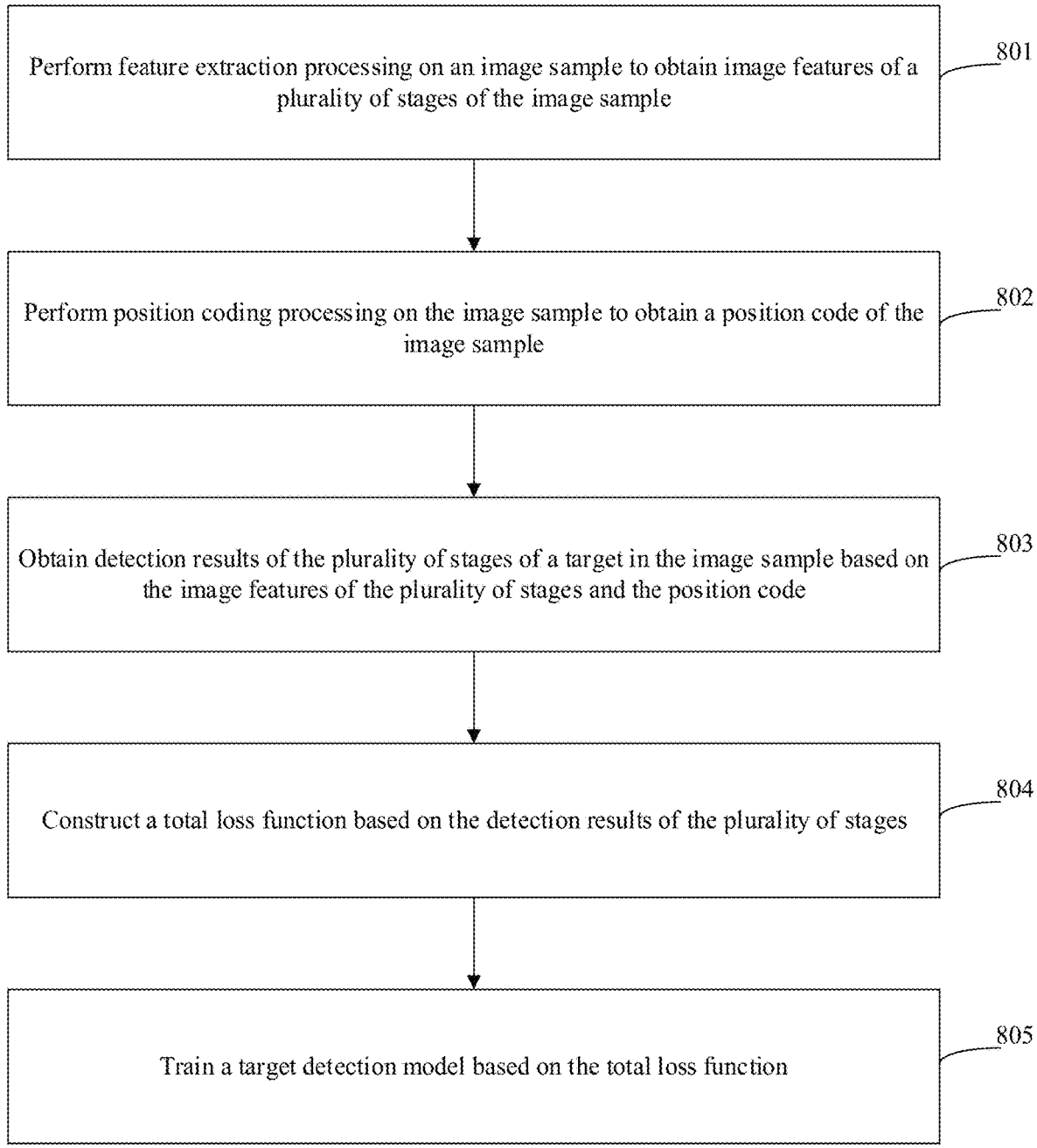
FIG. 8 is a schematic diagram according to an eighth embodiment of the present disclosure.

FIG. 8 is a schematic diagram according to an eighth embodiment of the present disclosure. This embodiment provides a target detection model training method. The method includes the following steps.

In 801, feature extraction processing is performed on an image sample to obtain image features of a plurality of stages of the image sample.

In 802, position coding processing is performed on the image sample to obtain a position code of the image sample.

In 803, detection results of the plurality of stages of a target in the image sample are obtained based on the image features of the plurality of stages and the position code.

In 804, a total loss function is constructed based on the detection results of the plurality of stages and a truth value of the target.

In 805, a target detection model is trained based on the total loss function.

An image used in a training stage may be called an image sample. The image sample may be obtained from an existing training set.

After the image sample is acquired, a target in the image sample may be manually annotated to obtain a truth value of the target in the image sample. The truth value is a real result of the target, such as a real 3D 7-dimensional tensor and a category label. The corresponding category may generally be annotated as 1.

In some embodiments, the detection results of the plurality of stages include detection results of at least one category, and the step of constructing a total loss function based on the detection results of the plurality of stages includes:

determining to-be-fused results in the detection results of the plurality of stages, fusing the to-be-fused results to obtain a fusion result, and constructing a first loss function based on the fusion result;

determining a non-fusion result in the detection results of the plurality of stages, and constructing a second loss function based on the non-fusion result;

constructing a third loss function based on a category detection result in the detection results of the plurality of stages; and constructing the total loss function based on the first loss function, the second loss function and the third loss function.

That is, the total loss function may include three parts, which are a first loss function, a second loss function and a third loss function respectively. The first loss function is constructed based on the fusion result. The second loss function is constructed based on the non-fusion result. The third loss function is constructed based on the category.

By constructing the total loss function based on multiple aspects, more comprehensive information may be considered to construct a more accurate model.

In some embodiments, the detection results of the plurality of stages are 3D results, and the step of determining to-be-fused results in the detection results of the plurality of stages includes:

mapping the 3D results to 2D results;

determining an IoU between the 2D result corresponding to each of the plurality of detection results and a 2D truth value of the target; and taking, if the IoU is greater than a preset threshold in more than one stage, the detection results of the more than one stage as the to-be-fused results.

Based on the IoUs between the 2D results corresponding to the detection result and the 2D truth value, the detection results close to the truth value may be selected as the to-be-fused results.

In some embodiments, the detection results of the plurality of stages are 3D results, and the step of determining a non-fusion result in the detection results of the plurality of stages includes:

mapping the 3D results to 2D results;

determining an IoU between the 2D result corresponding to each of the plurality of detection results and a 2D truth value of the target; and taking, if the IoU is greater than a preset threshold in one stage, the detection result of the stage as the non-fusion result.

Based on the IoUs between the 2D results corresponding to the detection result and the 2D truth value, the detection result close to the truth value may be selected as the non-fusion result.

Different from a prediction stage, the detection results of the stages may be compared with the truth value in the training stage to determine the to-be-fused results.

For example, the 2D result corresponding to the detection result of the first stage includes A1 and B1, the 2D result corresponding to the detection result of the second stage includes A2 and B2, and truth values are A0 and B0 respectively. Then, an IoU between A1 and A0 and an IoU between A2 and A0 may be calculated respectively. Assuming that the two IoUs are greater than a preset threshold, the detection result corresponding to A1 in the first stage and the detection result corresponding to A2 in the second stage are to-be-fused results. Then, the detection results of the two stages may be fused to obtain a fusion result.

In another example, if the IoU between B1 and B0 is greater than the preset threshold and the IoU between B2 and B0 is less than the preset threshold, the detection result corresponding to B1 in the first stage is taken as a non-fusion result.

In some embodiments, the method further includes:
determining uncertainties of the detection results of the plurality of stages based on the image features of the plurality of stages and the position code;
the step of fusing the to-be-fused results includes:
fusing the to-be-fused results based on the uncertainties; and
the step of constructing a first loss function based on the fusion result includes:
regularizing the uncertainties to obtain regularized uncertainties; and
constructing the first loss function based on the fusion result and the regularized uncertainties.

A more accurate total loss function may be constructed by considering the uncertainty in the construction of the first loss function.

In some embodiments, the step of determining uncertainties of the detection results of the plurality of stages based on the image features of the plurality of stages and the position code includes:
splicing the image features of the plurality of stages and the position code to obtain a splicing tensor; and
processing the splicing tensor by using an attention network by taking the splicing tensor as input to the attention network, so as to obtain the uncertainties of the detection results of the plurality of stages.

The accuracy of the uncertainties may be improved by obtaining the uncertainties through the attention network.

Calculation formulas for the total loss function may be:

$$Loss_{all} = Loss_{3d}^{case1} + Loss_{3d}^{case2} + Loss_{cls}$$

$$Loss_{3d}^{case1} = |box_{3d}^{fuse} - gt_{3d}| + \sum_{i=1}^{N} \log(Un^i)$$

$$Loss_{3d}^{case2} = |box_{3d}^i - gt_{3d}|$$

$$Loss_{cls} = CrossEntropy(pred_{cls}, gt_{cls})$$

where $Loss_{all}$ denotes the total loss function, $Loss_{3d}^{case1}$ denotes the first loss function, $Loss_{3d}^{case2}$ denotes the second loss function, $Loss_{cls}$ denotes the third loss function, $gt_{3d}$ denotes a truth value of a 3D border of the target, CrossEntropy denotes a cross entropy operation, $pred_{cls}$ denotes a category probability value of a detection result obtained by the decoder, which is a value between [0,1], and $gt_{cls}$ denotes a category truth value of the target, which is 0 or 1. For example, if the target is a vehicle but a current detection target is a human, that is, the categories are inconsistent, the category truth value of the target may be annotated as 0. Conversely, if the target is a vehicle and the current detection target is also the vehicle, that is, the categories are consistent, the category truth value of the target may be annotated as 1.

After the total loss function is constructed, the training based on the total loss function may include: adjusting model parameters based on the total loss function until an end condition is reached, wherein the end condition may include: a preset number of iterations or convergence of the loss function, and taking the model when the end condition is reached as a final model.

The deep neural network included in the target detection model may specifically include a feature extraction network, a decoder and an attention network. Therefore, parameters of the three networks may be specifically adjusted when the model parameters are adjusted.

In the embodiment of the present disclosure, scale information may be referenced in the total loss function by constructing the total loss function based on detection results of a plurality of stages, and distance information may be referenced by considering a position code when the detection results of the plurality of stages are obtained. Therefore, the total loss function refers to the scale information and the distance information, which can improve the accuracy of target detection.

Figure 9:
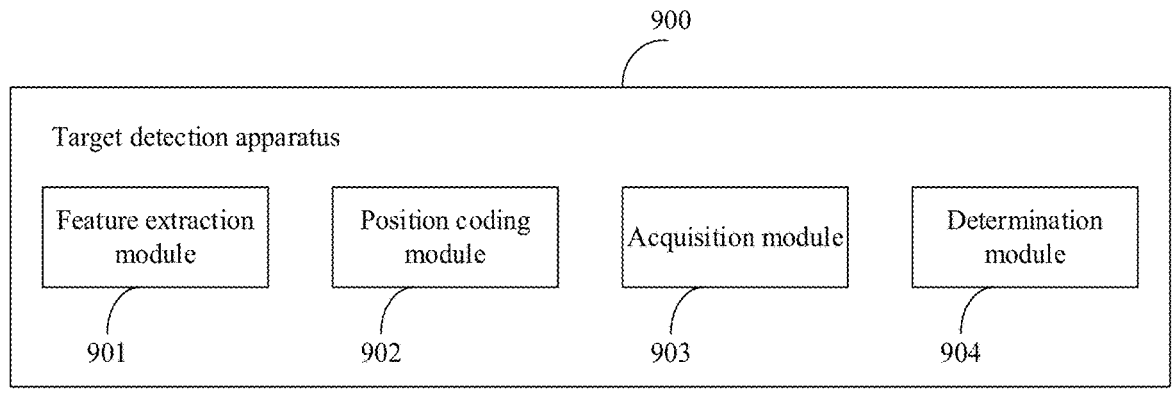
FIG. 9 is a schematic diagram according to a ninth embodiment of the present disclosure.

FIG. 9 is a schematic diagram of a ninth embodiment of the present disclosure. This embodiment provides a target detection apparatus. The apparatus 900 includes: a feature extraction module 901, a position coding module 902, a first acquisition module 903 and a second acquisition module 904.

The feature extraction module 901 is configured to perform feature extraction processing on an image to obtain image features of a plurality of stages of the image. The position coding module 902 is configured to perform position coding processing on the image to obtain a position code of the image. The first acquisition module 903 is configured to obtain detection results of the plurality of stages of a target in the image based on the image features of the plurality of stages and the position code. The second acquisition module 904 is configured to obtain a target detection result based on the detection results of the plurality of stages.

In some embodiments, the detection results of the plurality of stages include detection results of at least one category, and the second acquisition module 904 is specifically configured to: determine to-be-fused results in the detection results of the plurality of stages; fuse the to-be-fused results to obtain target detection results of categories corresponding to the to-be-fused results; and/or take not-to-be-fused results in the detection results of the plurality of stages as target detection results of categories corresponding to the not-to-be-fused results.

In some embodiments, the apparatus 900 further includes: a determination module configured to determine uncertainties of the detection results of the plurality of stages based on the image features of the plurality of stages and the position code; and the second acquisition module 904 is further specifically configured to: fuse the to-be-fused results based on the uncertainties.

In some embodiments, the determination module is specifically configured to: splice the image features of the plurality of stages and the position code to obtain a splicing tensor; and process the splicing tensor by using an attention network by taking the splicing tensor as input to the attention network, so as to obtain the uncertainties of the detection results of the plurality of stages.

In some embodiments, the detection results of the plurality of stages are 3D results, and the second acquisition module 904 is further specifically configured to: map the 3D results to 2D results; determine IoUs between the 2D results corresponding to the detection results of the plurality of stages; and take the detection results of the plurality of stages as the to-be-fused results if the IoUs are greater than a preset threshold.

In the embodiment of the present disclosure, scale information may be referenced in target results by obtaining a target detection result based on detection results of a plurality of stages, and distance information may be referenced by considering a position code when the detection results of the plurality of stages are obtained. Therefore, the target detection results refer to the scale information and the distance information, which can improve the accuracy of target detection.

Figure 10:
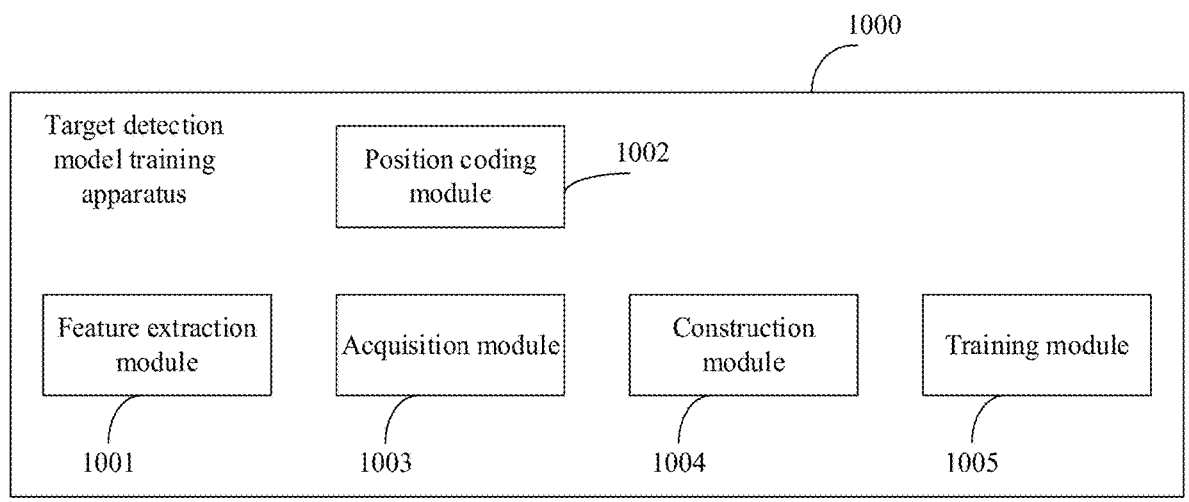
FIG. 10 is a schematic diagram according to a tenth embodiment of the present disclosure.

FIG. 10 is a schematic diagram of a tenth embodiment of the present disclosure. This embodiment provides a target detection model training apparatus. The apparatus 1000 includes: a feature extraction module 1001, a position coding module 1002, an acquisition module 1003, a construction module 1004 and a training module 1005.

The feature extraction module 1001 is configured to perform feature extraction processing on an image sample to obtain image features of a plurality of stages of the image sample. The position coding module 1002 is configured to perform position coding processing on the image sample to obtain a position code of the image sample. The acquisition module 1003 is configured to obtain detection results of the plurality of stages of a target in the image sample based on the image features of the plurality of stages and the position code. The construction module 1004 is configured to construct a total loss function based on the detection results of the plurality of stages. The training module 1005 is configured to train a target detection model based on the total loss function.

In some embodiments, the detection results of the plurality of stages include detection results of at least one category, and the construction module 1004 is specifically configured to:

determine to-be-fused results in the detection results of the plurality of stages, fuse the to-be-fused results to obtain a fusion result, and construct a first loss function based on the fusion result;

determine a non-fusion result in the detection results of the plurality of stages, and construct a second loss function based on the non-fusion result;

construct a third loss function based on a category detection result in the detection results of the plurality of stages; and construct the total loss function based on the first loss function, the second loss function and the third loss function.

In some embodiments, the apparatus 1000 further includes:

a determination module configured to determine uncertainties of the detection results of the plurality of stages based on the image features of the plurality of stages and the position code; and The construction module 1004 is further specifically configured to: fuse the to-be-fused results based on the uncertainties; and regularize the uncertainties to obtain regularized uncertainties; and construct the first loss function based on the fusion result and the regularized uncertainties.

In some embodiments, the determination module is specifically configured to: splice the image features of the plurality of stages and the position code to obtain a splicing tensor; and process the splicing tensor by using an attention network by taking the splicing tensor as input to the attention network, so as to obtain the uncertainties of the detection results of the plurality of stages.

In some embodiments, the detection results of the plurality of stages are 3D results, and the construction module 1004 is further specifically configured to: map the 3D results to 2D results; determine an IoU between the 2D result corresponding to each of the plurality of detection results and a 2D truth value of the target; and take, if the IoU is greater than a preset threshold in more than one stage, the detection results of the more than one stage as the to-be-fused results.

In some embodiments, the detection results of the plurality of stages are 3D results, and the construction module 1004 is further specifically configured to: map the 3D results to 2D results; determine an IoU between the 2D result corresponding to each of the plurality of detection results and a 2D truth value of the target; and take, if the IoU is greater than a preset threshold in one stage, the detection result of the stage as the non-fusion result.

In the embodiment of the present disclosure, scale information may be referenced in the total loss function by constructing the total loss function based on detection results of a plurality of stages, and distance information may be referenced by considering a position code when the detection results of the plurality of stages are obtained. Therefore, the total loss function refers to the scale information and the distance information, which can improve the accuracy of target detection.

It may be understood that the same or similar contents in different embodiments may be referred to each other in the embodiments of the present disclosure.

It may be understood that "first", "second" and the like in the embodiments of the present disclosure are intended only for differentiation, and do not indicate a degree of importance or sequence.

Processing such as collection, storage, use, processing, transmission, provision and disclosure of users' personal information involved in the technical solutions of the present disclosure comply with relevant laws and regulations, and do not violate public order and moral.

According to embodiments of the present disclosure, the present disclosure further provides an electronic device, a readable storage medium and a computer program product.

Figure 11:
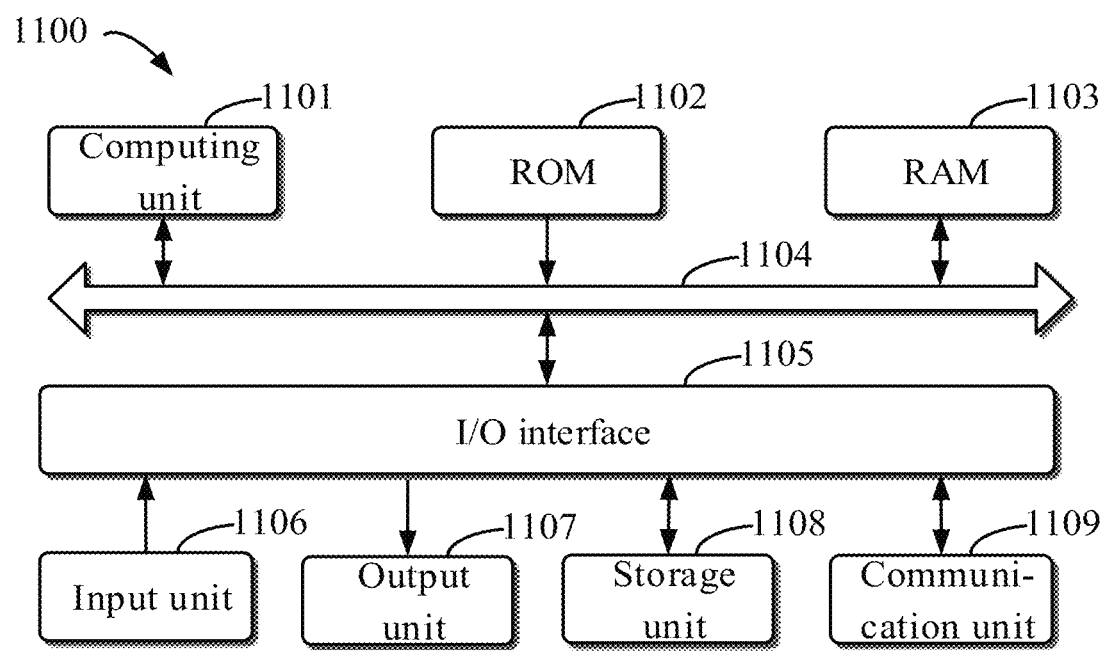
FIG. 11 is a schematic diagram of an electronic device configured to implement any one of target detection or target detection model training methods according to embodiments of the present disclosure.

FIG. 11 is a schematic block diagram of an exemplary electronic device 1100 configured to perform embodiments of the present disclosure. The electronic device is intended to represent various forms of digital computers, such as laptops, desktops, workbenches, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 11, the electronic device 1100 includes a computing unit 1101, which may perform various suitable actions and processing according to a computer program stored in a read-only memory (ROM) 1102 or a computer program loaded from a storage unit 1108 into a random access memory (RAM) 1103. The RAM 1103 may also store various programs and data required to operate the electronic device 1100. The computing unit 1101, the ROM 1102 and the RAM 1103 are connected to one another by a bus 1104. An input/output (I/O) interface 1105 is also connected to the bus 1104.

A plurality of components in the electronic device 1100 are connected to the I/O interface 1105, including an input unit 1106, such as a keyboard and a mouse; an output unit 1107, such as various displays and speakers; a storage unit 1108, such as disks and discs; and a communication unit 1109, such as a network card, a modem and a wireless communication transceiver. The communication unit 1109 allows the electronic device 1100 to exchange information/data with other devices over computer networks such as the Internet and/or various telecommunications networks.

The computing unit 1101 may be a variety of general-purpose and/or special-purpose processing components with processing and computing capabilities. Some examples of the computing unit 1101 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 1101 performs the methods and processing described above, such as the target detection method or target detection model training method. For example, in some embodiments, the target detection method or target detection model training method may be implemented as a computer software program that is tangibly embodied in a machine-readable medium, such as the storage unit 1108. In some embodiments, part or all of a computer program may be loaded and/or installed on the electronic device 1100 via the ROM 1102 and/or the communication unit 1109. One or more steps of the summary generation model training method described above may be performed when the computer program is loaded into the RAM 1103 and executed by the computing unit 1101. Alternatively, in other embodiments, the computing unit 1101 may be configured to perform the target detection method or target detection model training method by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a Virtual Private Server (VPS). The server may also be a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A target detection method, comprising:
    performing feature extraction processing on an image to obtain image features of a plurality of stages of the image;
    performing position coding processing on the image to obtain a position code of the image;
    obtaining detection results of the plurality of stages of a target in the image based on the image features of the plurality of stages and the position code; and
    obtaining a target detection result based on the detection results of the plurality of stages,
    wherein the detection results of the plurality of stages comprise detection results of at least one category, and the step of obtaining a target detection result based on the detection results of the plurality of stages comprises:
    determining to-be-fused results in the detection results of the plurality of stages;
    fusing the to-be-fused results to obtain target detection results of categories corresponding to the to-be-fused results; and/or
    taking not-to-be-fused results in the detection results of the plurality of stages as target detection results of categories corresponding to the not-to-be-fused results.

2. The method according to claim 1, further comprising:
    determining uncertainties of the detection results of the plurality of stages based on the image features of the plurality of stages and the position code; and
    the step of fusing the to-be-fused results comprising:
    fusing the to-be-fused results based on the uncertainties.

3. The method according to claim 2, wherein the step of determining uncertainties of the detection results of the plurality of stages based on the image features of the plurality of stages and the position code comprises:
    splicing the image features of the plurality of stages and the position code to obtain a splicing tensor; and
    processing the splicing tensor by using an attention network by taking the splicing tensor as input to the attention network, so as to obtain the uncertainties of the detection results of the plurality of stages.

4. The method according to claim 3, wherein the detection results of the plurality of stages are 3D results, and the step of determining to-be-fused results in the detection results of the plurality of stages comprises:
    mapping the 3D results to 2D results;
    determining Intersection-over-Unions (IoUs) between the 2D results corresponding to the detection results of the plurality of stages; and
    taking the detection results of the plurality of stages as the to-be-fused results if the IoUs are greater than a preset threshold.

5. The method according to claim 2, wherein the detection results of the plurality of stages are 3D results, and the step of determining to-be-fused results in the detection results of the plurality of stages comprises:
    mapping the 3D results to 2D results;
    determining Intersection-over-Unions (IoUs) between the 2D results corresponding to the detection results of the plurality of stages; and
    taking the detection results of the plurality of stages as the to-be-fused results if the IoUs are greater than a preset threshold.

6. The method according to claim 1, wherein the detection results of the plurality of stages are 3D results, and the step of determining to-be-fused results in the detection results of the plurality of stages comprises:
    mapping the 3D results to 2D results;
    determining Intersection-over-Unions (IoUs) between the 2D results corresponding to the detection results of the plurality of stages; and
    taking the detection results of the plurality of stages as the to-be-fused results if the IoUs are greater than a preset threshold.

7. A target detection model training method, comprising:
    performing feature extraction processing on an image sample to obtain image features of a plurality of stages of the image sample;
    performing position coding processing on the image sample to obtain a position code of the image sample;
    obtaining detection results of the plurality of stages of a target in the image sample based on the image features of the plurality of stages and the position code;
    constructing a total loss function based on the detection results of the plurality of stages; and
    training a target detection model based on the total loss function.

8. The method according to claim 7, wherein the detection results of the plurality of stages comprise detection results of at least one category, and the step of constructing a total loss function based on the detection results of the plurality of stages comprises:
    determining to-be-fused results in the detection results of the plurality of stages, fusing the to-be-fused results to obtain a fusion result, and constructing a first loss function based on the fusion result;
    determining a non-fusion result in the detection results of the plurality of stages, and constructing a second loss function based on the non-fusion result;
    constructing a third loss function based on a category detection result in the detection results of the plurality of stages; and
    constructing the total loss function based on the first loss function, the second loss function and the third loss function.

9. The method according to claim 8, further comprising:
    determining uncertainties of the detection results of the plurality of stages based on the image features of the plurality of stages and the position code;
    the step of fusing the to-be-fused results comprising:
    fusing the to-be-fused results based on the uncertainties; and
    the step of constructing a first loss function based on the fusion result comprising:
    regularizing the uncertainties to obtain regularized uncertainties; and constructing the first loss function based on the fusion result and the regularized uncertainties.

10. The method according to claim 9, wherein the step of determining uncertainties of the detection results of the plurality of stages based on the image features of the plurality of stages and the position code comprises:
splicing the image features of the plurality of stages and the position code to obtain a splicing tensor; and
processing the splicing tensor by using an attention network by taking the splicing tensor as input to the attention network, so as to obtain the uncertainties of the detection results of the plurality of stages.

11. The method according to claim 9, wherein the detection results of the plurality of stages are 3D results, and the step of determining to-be-fused results in the detection results of the plurality of stages comprises:
mapping the 3D results to 2D results;
determining an IoU between the 2D result corresponding to each of the plurality of detection results and a 2D truth value of the target; and
taking, if the IoU is greater than a preset threshold in more than one stage, the detection results of the more than one stage as the to-be-fused results.

12. The method according to claim 8, wherein the detection results of the plurality of stages are 3D results, and the step of determining to-be-fused results in the detection results of the plurality of stages comprises:
mapping the 3D results to 2D results;
determining an IoU between the 2D result corresponding to each of the plurality of detection results and a 2D truth value of the target; and
taking, if the IoU is greater than a preset threshold in more than one stage, the detection results of the more than one stage as the to-be-fused results.

13. The method according to claim 8, wherein the detection results of the plurality of stages are 3D results, and the step of determining a non-fusion result in the detection results of the plurality of stages comprises:
mapping the 3D results to 2D results;
determining an IoU between the 2D result corresponding to each of the plurality of detection results and a 2D truth value of the target; and
taking, if the IoU is greater than a preset threshold in one stage, the detection result of the stage as the non-fusion result.

14. An electronic device, comprising:
at least one processor; and
a memory communicatively connected with the at least one processor;
wherein the memory stores instructions executable by the at least one processor, and the instructions are executed by the at least one processor to enable the at least one processor to perform a target detection method, wherein the target detection method comprises:
performing feature extraction processing on an image to obtain image features of a plurality of stages of the image;
performing position coding processing on the image to obtain a position code of the image;
obtaining detection results of the plurality of stages of a target in the image based on the image features of the plurality of stages and the position code; and
obtaining a target detection result based on the detection results of the plurality of stages,
wherein the detection results of the plurality of stages comprise detection results of at least one category, and the step of obtaining a target detection result based on the detection results of the plurality of stages comprises:
determining to-be-fused results in the detection results of the plurality of stages;
fusing the to-be-fused results to obtain target detection results of categories corresponding to the to-be-fused results; and/or
taking not-to-be-fused results in the detection results of the plurality of stages as target detection results of categories corresponding to the not-to-be-fused results.

15. The electronic device according to claim 14, further comprising:
determining uncertainties of the detection results of the plurality of stages based on the image features of the plurality of stages and the position code; and
the step of fusing the to-be-fused results comprising:
fusing the to-be-fused results based on the uncertainties.

16. The electronic device according to claim 15, wherein the step of determining uncertainties of the detection results of the plurality of stages based on the image features of the plurality of stages and the position code comprises:
splicing the image features of the plurality of stages and the position code to obtain a splicing tensor; and
processing the splicing tensor by using an attention network by taking the splicing tensor as input to the attention network, so as to obtain the uncertainties of the detection results of the plurality of stages.

17. The electronic device according to claim 14, wherein the detection results of the plurality of stages are 3D results, and the step of determining to-be-fused results in the detection results of the plurality of stages comprises:
mapping the 3D results to 2D results;
determining IoUs between the 2D results corresponding to the detection results of the plurality of stages; and
taking the detection results of the plurality of stages as the to-be-fused results if the IoUs are greater than a preset threshold.

18. A non-transitory computer readable storage medium with computer instructions stored thereon, wherein the computer instructions are used for causing a computer to perform a target detection method, wherein the target detection method comprises:
performing feature extraction processing on an image to obtain image features of a plurality of stages of the image;
performing position coding processing on the image to obtain a position code of the image;
obtaining detection results of the plurality of stages of a target in the image based on the image features of the plurality of stages and the position code; and
obtaining a target detection result based on the detection results of the plurality of stages,
wherein the detection results of the plurality of stages comprise detection results of at least one category, and the step of obtaining a target detection result based on the detection results of the plurality of stages comprises:
determining to-be-fused results in the detection results of the plurality of stages;
fusing the to-be-fused results to obtain target detection results of categories corresponding to the to-be-fused results; and/or
taking not-to-be-fused results in the detection results of the plurality of stages as target detection results of categories corresponding to the not-to-be-fused results.

* * * * *